(12) United States Patent
Melchert

(10) Patent No.: US 9,390,634 B2
(45) Date of Patent: Jul. 12, 2016

(54) LABEL SUPPLY FOR AN EASY CLIP ATTACHMENT

(71) Applicant: Poly-clip System GmbH & Co. KG, Hattersheim (DE)

(72) Inventor: Uwe Melchert, Frankfurt (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 34 days.

(21) Appl. No.: 14/513,586

(22) Filed: Oct. 14, 2014

(65) Prior Publication Data

US 2015/0104603 A1 Apr. 16, 2015

(30) Foreign Application Priority Data

Oct. 14, 2013 (EP) ..................................... 13188501

(51) Int. Cl.
B32B 3/02 (2006.01)
G09F 3/02 (2006.01)
A22C 15/00 (2006.01)

(52) U.S. Cl.
CPC .............. *G09F 3/02* (2013.01); *A22C 15/002* (2013.01); *G09F 2003/0222* (2013.01); *G09F 2003/0227* (2013.01)

(58) Field of Classification Search
CPC ............... Y10T 428/24008; G09F 2003/0227
USPC ........................................................... 428/99
See application file for complete search history.

(56) References Cited

U.S. PATENT DOCUMENTS

| 2,434,545 A | * | 1/1948 | Brady, Jr. ................. G09F 3/10 |
| | | | 132/73 |
| 2,364,581 A | | 6/1975 | Buchholz |
| 6,652,946 B1 | | 11/2003 | Sauer |
| 2005/0139325 A1 | | 6/2005 | Bleckmann et al. |

FOREIGN PATENT DOCUMENTS

| DE | 2364581 | 6/1975 |
| EP | 0267871 | 5/1988 |
| EP | 2384641 | 11/2011 |

OTHER PUBLICATIONS

Request for Examination Dated Oct. 30, 2015 From the Rospatent, Federal Government Institution, Federal Institute of Industrial Property of the Federal Service of Intellectual Property, Patents and Trademarks of the Russian Federation Re. Application No. 2014141287 and Its Translation Into English.
European Search Report and the European Search Opinion Dated Apr. 4, 2014 From the European Patent Office Re. Application No. 13188501.4.
Official Action issued in corresponding Russian Application No. 2014141287 dated Jan. 29, 2016 and English translation of same (6 pages).

* cited by examiner

*Primary Examiner* — Alexander Thomas

(74) *Attorney, Agent, or Firm* — Fitch, Even, Tabin & Flannery LLP

(57) ABSTRACT

The present invention relates to a supply of labels for being attached to sausage-shaped products, like sausages. The supply comprises a carrier strip having a longitudinal extension, a flat front side, a flat rear side and two longitudinal edges, and at least one label having a longitudinal extension, a flat front side and a flat rear side and an attachment end for being attached to the sausage-shaped product, the at least one label is detachable attached to the carrier strip, wherein at least the attachment end of the at least one label exceeds one of the longitudinal edges of the carrier strip.

12 Claims, 4 Drawing Sheets

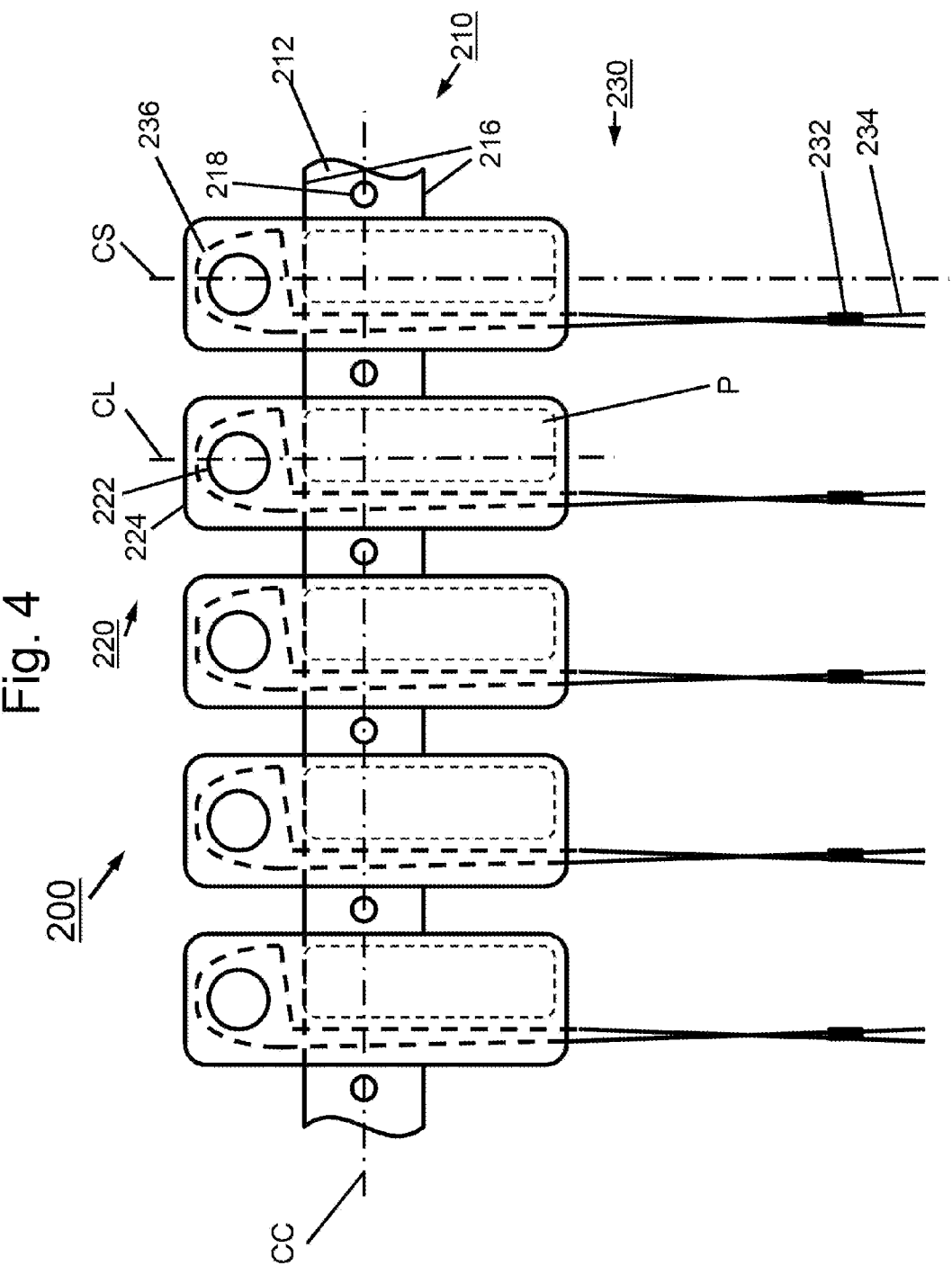

LABEL SUPPLY FOR AN EASY CLIP ATTACHMENT

RELATED APPLICATION

This application claims the benefit of priority of European Patent Application No. 13188501.4 filed Oct. 14, 2013, the contents of which are incorporated herein by reference in their entirety.

FIELD AND BACKGROUND OF THE INVENTION

The present invention relates to a supply of labels for being attached, in particular by clips, to sausage-shaped products, like sausages, according to claim 1.

In practice, it is known that, for example in the production of sausage-shaped products, like sausages, filling material is fed by a filling machine through a filling tube of a clipping machine into a tubular or bag-shaped packaging casing which is stored on the filling tube and which is closed at its front end, i.e. the end facing in the feeding direction of the filling material by a closure means, like a closure clip. The tubular or bag-shaped packaging casing is pulled-off from the filling tube by the feeding pressure while being filled. After a pre-determined volume of filling material has been filled into said tubular packaging casing, a displacer arrangement with a first and a second displacer unit which can each be formed by a pair of reversibly moveable displacement elements, a plait-like portion of the tubular packaging casing is formed. The clipping machine then places and closes at least one closure clip at the plait-like portion forming the rear end of the sausage shaped product, i.e. the end pointing against the feeding direction by respective closing tools which are reversibly movable towards the plait-like portion. If the sausage product is later to be hung up for example for the purposes of smoking or storing, a suspension element, like a suspension loop, is fed thereto in such a way that the closure clip engages said suspension element and the suspension element is secured to the sausage-shaped product.

Conventionally, information regarding the kind of product or the manufacturer are pre-printed on the packaging casing which is then filled with the respective sausage meat. In order to provide additional information to the sausage-shaped product, like the production date or the best before date, an additional label may be attached to the sausage-shaped product, which is secured to the sausage-shaped product together with one of the closure clips. With the known techniques, the label is fed separately from the suspension element to the clipping machine to be fixed to the sausage-shaped product by that closure clip closing the front end of said product in order to prevent the label from affecting the feeding and/or fixation of the suspension element.

From DE utility model 94 15 379, a clipping machine is known, which includes a feeder for stepwise feeding an endless chain of tags or labels into the closing area of the clipping machine. The endless chain of labels is wound up to a role wherein the longitudinal extension for a single label is parallel to the feeding direction of the endless chain of labels wound up. For attaching a single label to a sausage-shaped product, the endless chain of labels is fed stepwise by the feeder wherein the front-most label being still a part of the endless chain of labels is guided in an angle of 45° referred to the feeding direction of the endless chain of labels. Short before attaching a single label to a sausage-shaped product a cutting device separates this front-most label from the endless chain of labels. A control unit is provided for initiating the stepwise feeding of the chain of tags, and for cutting-off the tag to be attached from the chain of tags.

DE laid open document 199 34 444 discloses a suspension loop for sausage-shaped products, like sausages. A single suspension loop is formed by a flat strip which is provided with openings at its ends. For being attached to the sausage-shaped product, the strip is folded such that the openings at the ends of the strip are arranged congruent. The closure clip which closes the end of the just produced sausage-shaped product engages both openings of the strip and attaches the loop-shaped strip to the end of the sausage-shaped product. On said strip, information regarding the sausage-shaped product or the producer may be printed. The strip is made of a material, like a suitable plastic, which is sufficiently strong for carrying the sausage-shaped product, and for being treated together with the sausage-shaped product, like smoking or cooking of a sausage.

For attaching a label or tag to the sausage-shaped product, an apparatus, namely a label or tag feeder, is necessary, which needs space, in particular, in the vicinity to the closing region of the clipping machine, for feeding the label thereto, and which has to be incorporated into the control unit of the clipping machine. Moreover, as disclosed in DE utility model 94 15 379, a cutting device is necessary for separating a single label from the endless chain of label. Furthermore, additional sensor and control elements are necessary for controlling the feeding interval and adjusting the feeding interval to the closing operation as well as for controlling the cutting device. Furthermore, in the case that a label is used for forming a loop for suspending a sausage-shaped product, the material of said label needs to be sufficiently strong. On the other hand, the handling of a sausage-shaped product hanging on said label loop, is much more difficult than a suspension loop formed by a string, e.g. when transported along a catching device for said suspension loop, or when being hung up on a smoking rod or the like.

SUMMARY OF THE INVENTION

Thus, it is an object of the present invention to provide a supply of labels, with which the above mentioned drawbacks are overcome, and which enables a cost-efficient and reliable attachment of a label to the sausage-shaped product.

According to the present invention, there is provided a supply of labels for being attached, in particular by a clip, to sausage-shaped products, like sausages. The supply comprises a carrier strip having a longitudinal extension, a flat front side, a flat rear side as well as two longitudinal edges, and at least one label having a longitudinal extension, a flat front side, a flat rear side and an attachment end for being attached to the sausage-shaped product. The at least one label is detachable attached to the carrier strip, preferably to the front side of the carrier strip. At least the attachment end of the at least one label exceeds one of the longitudinal edges of the carrier strip.

In this configuration, there is no need for a cutting device since each label is already separated from the other labels being carried by the carrier strip. Moreover, a specific guidance for the labels is not necessary for allowing a gripping of a label to be attached by a clip to a sausage-shaped product. Therefore, the overall construction of a clipping machine being provided with the inventive supply of labels can be designed in a less complicated way.

For a secure carrying of the labels on the carrier strip, it is possible that the labels are adhered by an adhesive to the carrier strip. The adhesive should be selected such that the label is securely adhered to the carrier strip, but can easily be detached from the carrier strip during the attachment of the label by a clip.

Naturally, more than one label may be attached to the carrier strip. In a preferred embodiment, a plurality labels is detachable attached to the carrier strip, in particular to the front side of the carrier strip.

In the case that more than one label is attached to the carrier strip, it is further preferred that the labels are arranged in regular intervals preferably on the front side of the carrier strip, e.g. for being fed stepwise to the clipping machine.

In an advantageous embodiment of the inventive supply of labels, the attachment ends of the labels exceed the longitudinal edge of the carrier strip at the same side. This configuration enables to feed the labels of the inventive supply of labels to a clipping machine on known feeding devices for suspension elements.

For an easy attachment of the labels to the sausage-shaped product, it is preferred that the at least one label is attached to the front side of the carrier strip in an orientation its longitudinal extension being at least substantially perpendicular to the longitudinal extension of the carrier strip. This orientation of the label enables an easy and secure delivery of the attachment end of said label to the closing area of the clipping machine, where the label may be caught by a closure clip and attached to the end of a sausage-shaped product.

In a further advantageous embodiment, the labels are arranged at least approximately parallel to each other with respect to their longitudinal extensions, which ensures a regular orientation of the labels on the carrier strip.

In order to enable a secure and reliable feeding of the labels to the clipping machine, feeding openings are arranged preferably in regular intervals along the carrier strip. A feeding mechanism may engage in said openings in the carrier strip, for stepwise or constantly feeding the labels to the clipping machine.

It is further preferred that the labels are made of sheet material and include at least one printable region. Labels of this configuration may be preprinted with the required information during the production of the inventive supply of labels or during the production process of the sausage-shaped products, e.g. immediately before the labels are attached thereto.

The labels attached to the carrier strip, have a longitudinal extension which is the length of the label, and a dimension vertically to the length, namely the width. The width of the carrier strip is the distance between its longitudinal edges. It has to be understood that the width of the carrier strip is preferably smaller than the length of the labels in order to enable the attachment end to exceed the longitudinal edge of the carrier strip, but large enough to provide a sufficient strength of the carrier strip, particular in the region of the feeding openings, to avoid tearing-off the carrier strip during transportation or detachment of the labels. Furthermore, also the labels should have a width that provides sufficient surface for attachment to the carrier strip, for detachably securing the labels thereto.

According to a further embodiment of the supply of labels, at least one suspension element, like a suspension loop, is provided that has a longitudinal extension and an attachment end for being attached to the sausage-shaped product, the at least one suspension element is detachable attached to the carrier strip, and is correlated with the at least one label, wherein at least the attachment end of the at least one suspension element exceeds one of the longitudinal edges of the carrier strip on the same side as the attachment end of the at least one label.

In this configuration, the suspension element correlated to the respective label and attached together with said label to the carrier strip, may be securely attached to a sausage-shaped product without the need of an additional feeding device. Moreover, since the suspension element is fed together with the correlated label, no additional control or sensor elements are necessary for attaching exactly one suspension element and exactly one label to the sausage-shaped product.

Naturally, the inventive supply of labels may be provided with a plurality of labels and a plurality of suspension elements detachable attached e.g. to the front side of the carrier strip, wherein each label is correlated with one suspension element. Preferably, the number of labels corresponds to the number of suspension elements. But, it is also possible that the number of labels differs from the number of suspension elements. That means that a suspension element may be provided on the carrier strip without being correlated with a label, e.g. each second or third suspension element, or that a single label may be attached to the carrier strip without a suspension element correlated thereto. This enables to selectively attach no label to a sausage-shaped product, or to attach e.g. two labels to one sausage-shaped product, one at each end thereof.

According to a preferred embodiment of the inventive supply of labels, the labels and the suspension elements are arranged at least approximately parallel to each other with respect to their longitudinal extensions, which enables an equal detachment of both the suspension element and the label, from the carrier strip.

To increase this effect, the label and the suspension element may be arranged at least substantially completely congruently. That means, the label over its entire length covers the suspension element, and the label and the suspension element may be commonly detached from the carrier strip during attachment to the sausage-shaped product. The partial or complete overlapping of the suspension element and the label further reduces the necessary attachment space and the length of the feeding step.

Preferably, the suspension element and the corresponding label are attached to the sausage-shaped product by the same closure clip, particularly, by the closure clip closing the rear end of the sausage-shaped product just produced. In order to enable a sure engagement of said closure clip with the suspension element and the label, the label has an attachment opening at its attachment end, which is at least partially surrounded by the attachment end of the suspension element, e.g. in the case that the suspension element comprises a hook-shaped attachment end, or that the suspension element is a suspension loop being only partially arranged closed to the attachment opening of the label.

The suspension element may have any suitable shape, like a hook, or may be a solid element having an attachment opening and a suspension opening. In a preferred embodiment, the suspension elements are flexible thread loops. In the case that it is intended to hung up the sausage-shaped products on rod-like elements, like smoking rods, flexible thread loops allow the use of rod-like elements of various cross-sections, like circular or rectangular cross-sections.

Further advantages and a preferred embodiment will be described in the following together with the drawings listed below. The expressions "left", "right", "below" and "above" used in the following description, are referred to the drawings in an alignment such that the reference numbers and the notation of the Figs. used can be read in normal.

BRIEF DESCRIPTION OF THE DRAWINGS

In the drawings:

FIG. 4: is a plan view to the front side of a third embodiment of a supply of labels according to the present invention.

DESCRIPTION OF SPECIFIC EMBODIMENTS OF THE INVENTION

Figure 1:
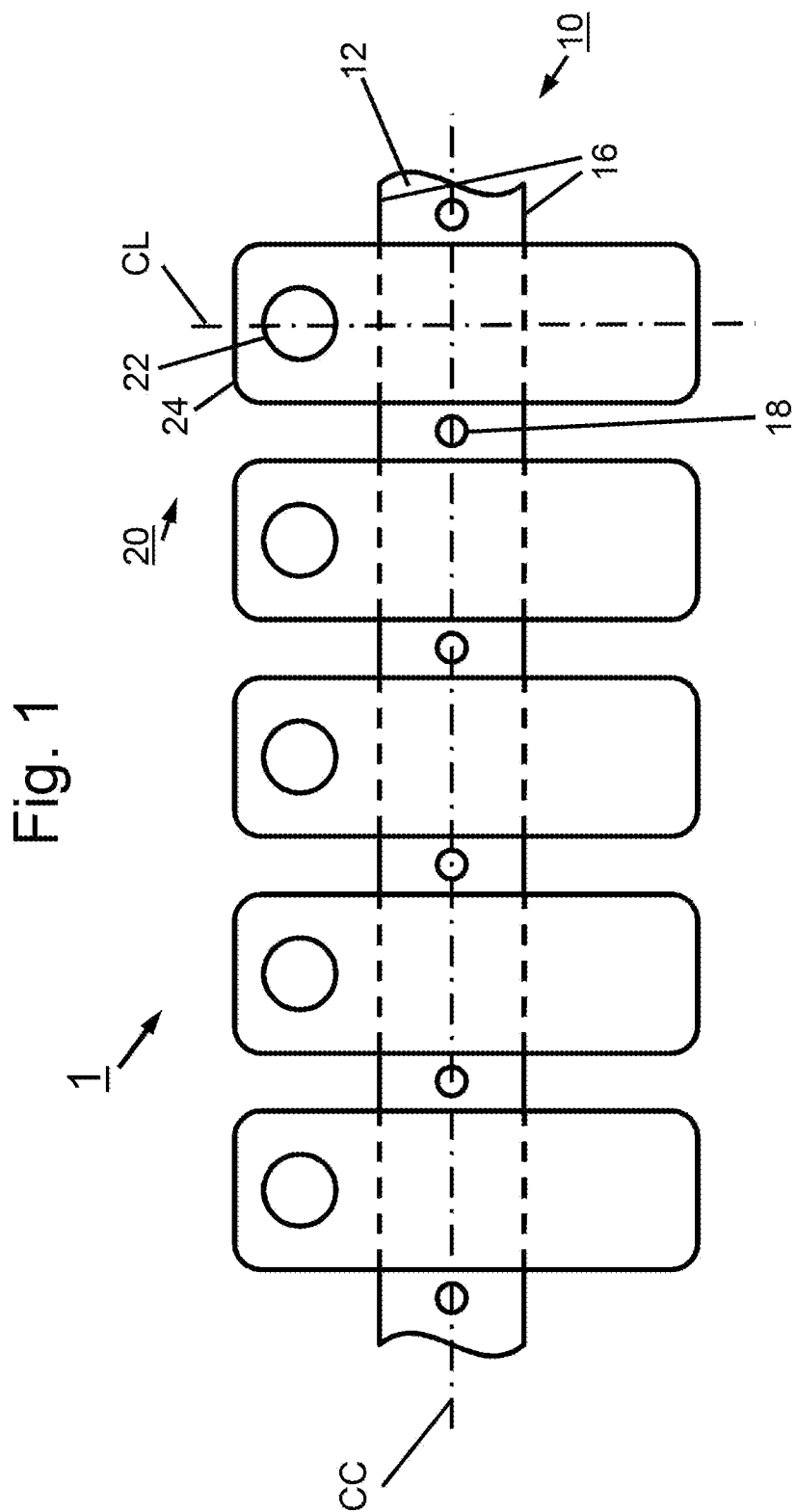
FIG. 1: is a plan view to the front side of a first embodiment of a supply of labels according to the present invention.

FIG. 1 shows a plan view to the front side of a first embodiment of a supply 1 of labels 20 according to the present invention.

The supply 1 includes a carrier strip 10 in the form of a flat band made of a suitable material, like plastic, fabric or paper. Carrier strip 10 has a front side or front surface 12, a rear side or rear surface 14 (not shown), and two longitudinal edges 16. Holes or feeding openings 18 are arranged in regular intervals on a center line CC of the carrier strip 10 extending in longitudinal direction along carrier strip 10, parallel to longitudinal edges 16.

As it further can be seen in FIG. 1, supply 1 comprises labels 20. A label 20 is made of a flat sheet material and has a rectangular shape including a longitudinal extension and a width wherein the longitudinal extension is larger than the width. Label 20 has a center line CL which is aligned in the direction of the longitudinal extension. Label 20 further has an attachment hole 22 and an attachment end 24 at which attachment hole 22 is arranged. Attachment hole 22 is preferably aligned with center line CL.

Labels 20 are arranged in regular intervals on carrier strip 10, with a feeding opening 18 between two subsequent labels 20. Center line CL of labels 20 is aligned approximately rectangular to center line CC of carrier strip 10.

Label 20 is detachably fixed to carrier strip 10 in its central region being in contact with carrier strip 10 between longitudinal edges 16. For detachably attaching label 20 to carrier strip 10, an adhesive film may be provided on front side 12 of carrier strip 10. Label 20, when being pressed front side 12 of carrier strip 10, comes in contact with the adhesive film on carrier strip 10. Alternatively to an adhesive film, and dependent on the material used, labels 20 may also be welded, e.g. spot-welded, to carrier strip 10, e.g. by laser or ultrasound.

The detachment force for removing labels 20 from carrier strip 10 is selected to prevent labels 20 from falling-off from carrier strip 10, e.g. during transportation, and to allow an easy peeling-off from carrier strip 10 without damaging labels 20 during fixation to the sausage-shaped product.

Figure 2:
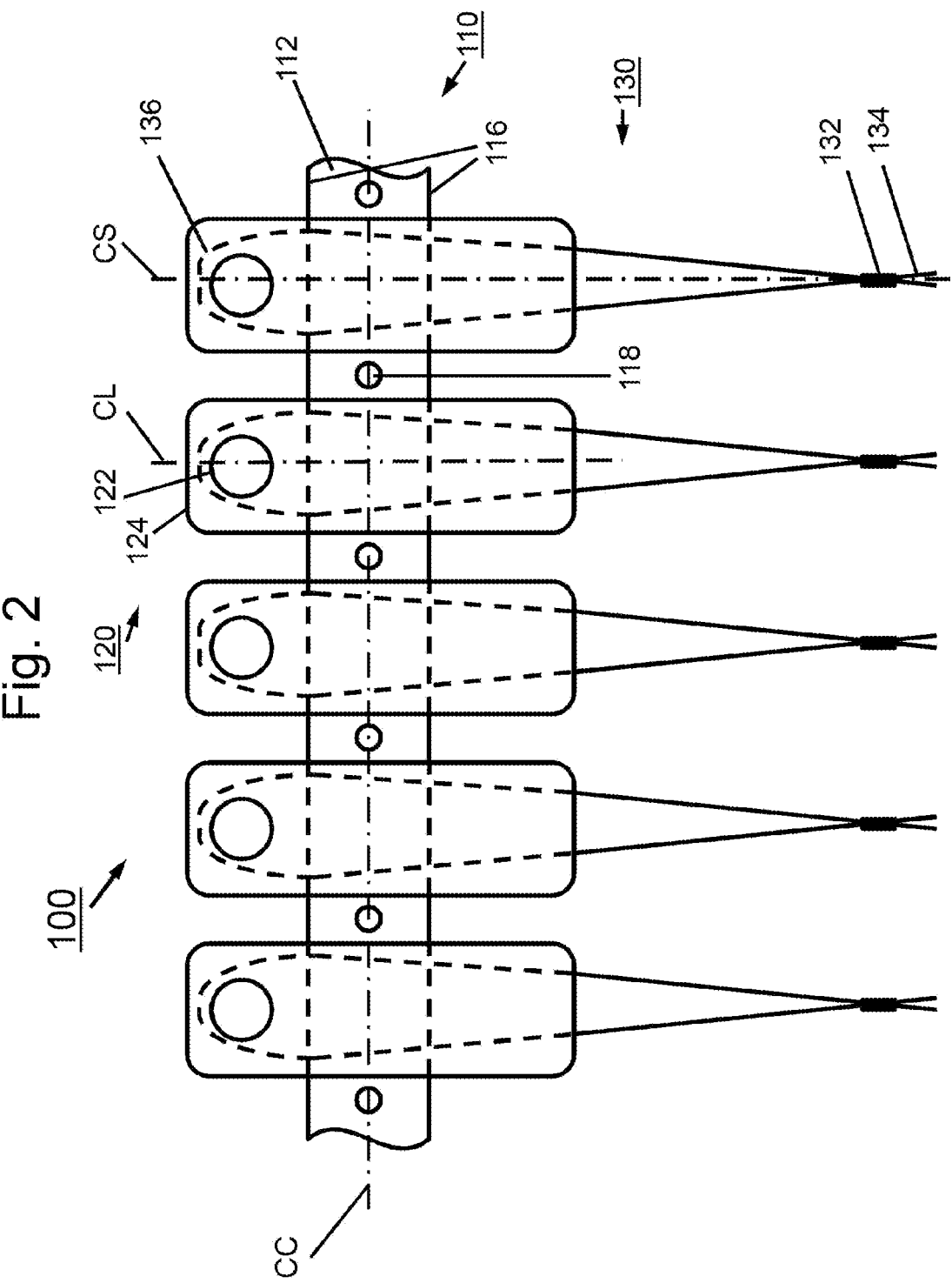
FIG. 2: is a plan view to the front side of a second embodiment of a supply of labels according to the present invention.
Figure 3:
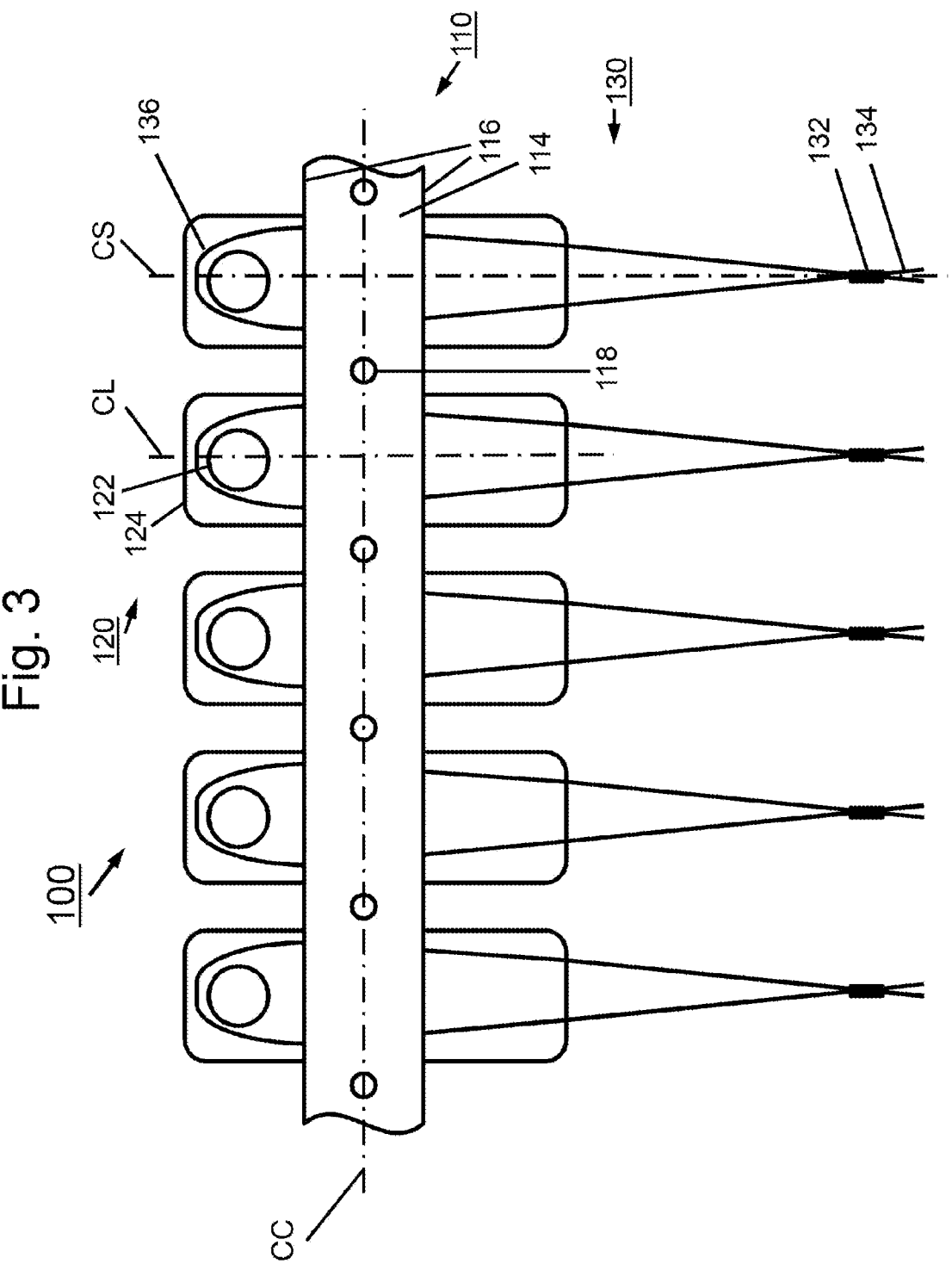
FIG. 3: is a plan view to the rear side of the second embodiment of a supply of labels according to FIG. 2.

FIG. 2 shows a plan view to the front side of a second embodiment of a supply 100 of labels 120 according to the present invention, and, FIG. 3 shows a plan view to the rear side of the supply 100 of labels 120 according to FIG. 2.

The supply 100 includes a carrier strip 110 which can be in the form of a flat band made of a suitable material, like plastic, fabric or paper like the carrier strip 10 of the first embodiment. Also similar to the carrier strip 10 of the first embodiment, carrier strip 110 has a front side or front surface 112, a rear side or rear surface 114 (see FIG. 3), and two longitudinal edges 116. Holes or feeding openings 118 are arranged in regular intervals on a centerline CC of the carrier strip 110 extending in longitudinal direction along carrier strip 110, parallel to longitudinal edges 116.

As it can be seen in FIGS. 2 and 3, supply 100 comprises labels 120. A label 120 is made of a flat sheet material and has a rectangular shape including a longitudinal extension. Label 120 has a center line CL which is aligned in the direction of the longitudinal extension. Label 120 further has an attachment hole 122 and an attachment end 124 at which attachment hole 122 is arranged. Attachment hole 122 is aligned with center line CL.

As it further can be seen in FIGS. 2 and 3, supply 100 further comprises suspension elements in the form of suspension loops 130 which are attached to front side 112 of carrier strip 110. Suspension loops 130 are made of a suitable string material, like a flexible thread of fabric or plastic, and the loop is closed by a knot 132 at one end 134. The other end 136 of suspension loop 130 forms the attachment end 136 by which suspension loop 130 is attached to a sausage-shaped product, as it will be described later. It has to be understood that the string of suspension loop 130 may also be closed by a suitable clip or the like.

Each suspension loop 130 further comprises a center line CS which coincides with the longitudinal extension of suspension loops 130, and which is arranged in longitudinal direction between knot 132 and attachment end 136 of suspension loop 130. Suspension loops 130 are arranged on the front side 112 of carrier strip 110, each between two subsequent feeding openings 118. Each suspension loop 130 is aligned with its center line CS at least substantially perpendicular to the center line CC of carrier strip 110. Moreover, attachment ends 136 of suspension loops 130 are arranged on the same side of carrier strip 110.

According to the embodiment of FIG. 2, suspension loops 130 and labels 120 are arranged pair-wise. That means, each suspension loop 130 is correlated with one label 120. Label 120 is positioned above suspension loop 120 such that center line CL of label 120 is arranged congruent with center line CS of suspension loop 120. Moreover, attachment end 124 of label 120 overlays attachment end 136 of suspension loop 130.

It has to be noted that it is also possible that more than one suspension loop 130 and also more than one label 120 is arranged between two subsequent feeding openings 118 on front side 112 of carrier strip 110. Suspension loops 130 and labels 120 only need to be arranged in regular intervals on carrier strip 110. Moreover, dependent on the specific configuration of the feeding mechanism, labels 120 and suspension loops 130 may also be arranged on the rear side 114 of carrier strip 110.

The free ends of the string material of each suspension loop 130 are coupled to each other by knot 132, thereby forming a closed loop. Two straight portions of the string material of suspension loop 130 extending from knot 132 towards its attachment end 136, diverging in the form of a "V", and merging into an approximately semicircular portion, forming attachment end 136. The at least approximately semicircular portion of attachment end 136 of suspension loop 130 partially surrounds attachment hole 122 of label 120.

Suspension loop 130 is detachably fixed to carrier strip 110 in the region of the straight portions of the string material positioned on carrier strip 110. Also, label 120 is detachably fixed to carrier strip 110 in its central region being in contact with carrier strip 110 between longitudinal edges 116. For detachably attaching label 120 and suspension loop 130 to carrier strip 110, an adhesive film may be provided on front side 112 of carrier strip 110. Suspension loop 130 is then fixed to front side 112 of carrier strip 110 over the entire length of the straight portions of the string material of suspension loop 130 being in direct contact with front side 112 of carrier strip 110 between longitudinal edges 116, e.g. by being pressed thereon. Label 120, when being pressed on the respective suspension loop 130, also comes in contact with the adhesive film on carrier strip 110 in the region between the straight portions of the string material of suspension loop 130, and laterally thereto. Alternatively to an adhesive film, and dependent on the material used, labels 120 and suspension loops 130 may also be welded, e.g. spot-welded, to carrier strip 110, e.g. by laser or ultrasound.

The detachment force for removing labels 120 and/or suspension loops 130 from carrier strip 110 is selected to prevent labels 120 and suspension loops 130 from falling-off from carrier strip 110, e.g. during transportation, and to allow an easy peeling-off from carrier strip 110 without damaging labels 120 and/or suspension loops 130 during fixation to the sausage-shaped product.

As it can be seen from FIGS. 2 and 3, suspension loop 130 is directly attached to front side 112 of carrier strip 110. Label 120 is than placed on suspension loop 130 such that suspension loop 130 is positioned, or sandwiched, respectively, between carrier strip 110 and label 120. Label 120 thereby covers attachment end 136 and the adjacent parts of the straight portions of the string material of suspension loop 130. In the case that an adhesive film is provided on front side 112 of carrier strip 110, label 120 and suspension loop 130 are fixed to carrier strip 110 by the adhesive film.

Alternatively, label 120 may be attached to front side 112 of carrier strip 110, and suspension loop 130 may be fixed to label 120 such that label 120 is positioned between carrier strip 110 and suspension loop 130. In this case, label 120 may be fixed to front side 112 of carrier strip 110 by an adhesive film provided there, and suspension loop 130, since it does not come in contact with front side 112 of carrier strip 110, has to be fixed to label 120, e.g. by an adhesive film provided on the surface of label 120 facing to suspension loop 130. Naturally, also in this configuration, labels 120 and suspension loops 130 may be fixed by other suitable means, e.g. by welding or the like.

FIG. 4 is a plan view to the front side of a supply 200 of labels 220 according to a third embodiment of the present invention.

Supply 200 according to the third embodiment comprises carrier strip 200 which is identical to carrier strips 10 and 110 of the first and second embodiments, with a front side 212, a rear side (not shown), longitudinal edges 216 and a center line CC arranged parallel to longitudinal edges 216. Carrier strip 210 of FIG. 4 also comprises holes or feeding openings 218 arranged in regular intervals along center line CC.

Labels 220 of supply 200 according to the third embodiment are also identical to the labels of the first and second embodiment shown in FIGS. 1 to 3. Thus, label 220 is made of a flat sheet material and has a rectangular shape including a longitudinal extension. Label 220 has a center line CL which is aligned in the direction of the longitudinal extension. Label 220 further has an attachment hole 222 arranged at an attachment end 224 and aligned with center line CL.

Suspension loops 230 of supply 200 are also made of a string material. The free ends 234 of the string material of suspension loop 230 are coupled to each other by knot 232, thereby forming a closed loop.

Labels 220 and suspension loops 230 are arranged on carrier strip 210 such that labels 220 and suspension loops 230 with their longitudinal extensions are aligned at least substantially perpendicular to the longitudinal extension or center line CC, and that attachment ends 224, 236 of labels 220 and suspension elements 230 overlay each other.

In contrast to suspension loop 130 of the second embodiment, the straight portions of the string material of suspension loop 230 of the third embodiment extending from its knot 232 towards its attachment end 236 are arranged at least approximately parallel to each other and on the same side of center line CL of label 220, in FIG. 4, the straight portions of the string material of suspension loop 230 are arranged on the left side of center line CL of label 220. The straight portions of the string material of suspension loop 230 extending from knot 232 towards attachment end 236, and merging there into an approximately circular portion which forms attachment end 236. The approximately circular portion of the string material forming attachment end 236 approximately completely surrounds attachment opening 222 at attachment end 224 of label 220. As it can be seen in FIG. 4, center line CS of each suspension loops 230 is aligned at least substantially parallel to the straight portions of the string material and extends through attachment end 236 formed by the approximately circular portion of the string material.

Label 220 according to the second embodiment of supply 200 further comprises a printable region P. Printable region P has an approximately rectangular shape and extends, as it can be seen in FIG. 4, approximately over the complete surface of label 220, except attachment end 224 including attachment hole 222, and that portion of label 220 which extends over suspension loop 230, particularly over the straight portions of the string material. Printable portion P of label 220 thereby forms a planar region which is not affected by suspension loops 230. Printable region P may thus not only be written by hand but also printed by a suitable printer, enabling a clear print image.

In the production of sausage-shaped products, filling material is fed through a filling tube into a tubular or bag-shaped packaging casing which is stored on said filling tube, and which is closed at its front end, e.g. by a closure clip. While feeding filling material into said tubular packaging casing, the tubular casing is pulled-off from the filling tube. After a predetermined portion of filling material has been filled into said tubular packaging casing, a displacer arrangement gathers the filled tubular packaging, and forms a plait-like portion to the filled tubular packaging casing. A clipping apparatus places a first closure clip to said plat-like portion for closing the just filled tubular casing material. The clipping machine may simultaneously place a second closure clip to the plait-like portion, which forms the front end of the sausage-shaped product subsequently to be produced. Closure clips used, conventionally are U-shaped, that means that they have two clip legs, which may be approximately parallel to each other, and a clip bottom which is arranged between two free ends of the approximately U-shaped closure clip. Naturally, the closure clips may also have a V-shape, with two legs diverging from the clip bottom towards their free ends.

For providing additional information to the sausage-shaped product just produced, if e.g. not pre-printed on the tubular casing material, a supply 1 of labels 20 may be provided by a known feeding device for feeding suspension loops. Supply 1 is positioned on said known feeding device and labels 20 are fed stepwise to the closing region of the clipping machine. Accordingly, one label 20 may be attached to each sausage-shaped product, preferably, to its rear end.

If the sausage-shaped product is later to be hung up for example for the purposes of smoking or storing, a supply 100, 200 may be provided, by means of which a suspension loop 130, 230 is fed thereto in such a way that, the first closure clip, when fed to the plait-like portion, engages attachment end 136, 236 of suspension loop 130, 230 with one of its legs, and pulls off suspension loop 130, 230 from carrier strip 110, 210.

Since attachment hole 122, 222 of attachment end 124, 224 of label 120, 220 is arranged congruently with attachment end 136, 236 of suspension loop 130, 230, label 120, 220 and suspension loop 130, 230 are together pulled off from carrier strip 110, 210 of supply 100, 200, and are together attached to the sausage-shaped product by the first closure clip forming the end of the sausage-shaped product just produced. A feeding mechanism is provided for feeding the next suspension loop 130, 230 together with a label 120, 220 correlated thereto, into the closing region of the clipping machine where the label 120, 220 and the suspension loop 130, 230 are engaged by a closure clip for being attached to the sausage-shaped product. Said feeding mechanism comprises at least one engagement element, like a wheel or roller which comprises spikes arranged in regular intervals and circumferentially around said roller. While driving said roller, the spikes engaged in holes or feeding openings 118, 218 of carrier strip 110, 210, transport labels 120, 220 and suspension loops 130, 230 attached to carrier strip 110, 210, into the closing region of the clipping machine.

When producing single sausage-shaped products, the plait-like portion is cut between the first and second closure clip. In this configuration, label 120, 220 and suspension loop 130, 230 are attached by the same closure clip to the sausage-shaped product or sausage. Said sausage may be consumed by cutting-off parts of the sausage, like slices, from the first end. Since label 120, 220 is attached to the second end, the information printed or written thereon, are maintained up to the very last end of the sausage.

In case that a chain of sausage-shaped products, like a sausage-chain, is produced, conventionally, only the last sausage in the chain is provided with one suspension loop 130, 230 by means of which the chain of sausages is hung up. Accordingly, when using the inventive supply 100, 200 of labels 120, 220, also label 120, 220 is attached to the last sausage in the chain. During consumption, e.g. by cutting of a whole sausage from the sausage-chain, the information printed or written on label 120, 220 remain at the last sausage, and thus, each time a piece of sausage or a complete sausage is cut-off from the chain of sausages, said information are available, e.g. to the customer.

For feeding a label 20, 120, 220 and a suspension loop 130, 230 of the inventive supply 1, 100, 200, only one feeding mechanism is necessary. That means that conventional loop feeder may be used for feeding the labels 20, 120, 220 and suspension loops 130, 230 of the inventive supply 1, 100, 200. Accordingly, no additional control device is necessary for feeding a single label 20 or coordinating the feeding of labels 120, 220 and suspension loops 130, 230.

In conjunction with the embodiments according to FIGS. 1 to 4, labels 20, 120, 220 have been disclosed as having a rectangular shape. Naturally, labels 20, 120, 220 may have any suitable shape, like a triangular or oval shape. Moreover, it is essentially to labels 120, 220 that they can be arranged on carrier strip 110, 210 and that an attachment end 124, 224 is provided, which can be correlated with attachment end 136, 236 of a suspension loop 130, 230.

It has to be understood that also label 20 according to the first embodiment of supply 1 may be provided with a printable region P, preferably on the surface being not affected by attachment hole 22. Also, dependent on the shape of label 20, 120, 220 printable region P also not necessarily needs to be of a rectangular shape.

The straight portions of the string material have been disclosed as being covered by label 120, 220. It is also possible that suspension loops 130, 230 are arranged laterally to label 120, 220. In this case, only attachment ends 124, 136; 224, 236 of labels 120, 220 and suspension elements 130, 230 need to overlay each other for being attached together to a sausage-shaped product. Alternatively, suspension elements 130, 230 and labels 120, 220 may completely be arranged laterally to each other, and attachment ends 136, 236 and 124, 224 of suspension elements 130, 230 and labels 120, 220 are positioned with a distance to each other corresponding to the distance of the two clips simultaneously attached to the plait-like portion of the gathered tubular casing material, for attaching suspension loop 130, 230 to the rear end of the sausage-shaped product just produced and label 120, 220 to the front end of the sausage-shaped product subsequently to be produced. For the same purpose, label 120, 220 may completely overlay suspension loop 130, 230, and only attachment ends 136, 236 and 124, 224 of suspension elements 130, 230 and labels 120, 220 are positioned with a distance to each other corresponding to the distance of the two clips simultaneously attached by the clipping machine.

What is claimed is:

1. A supply of labels for being attached to sausage-shaped products the supply comprises:
    a carrier strip having a longitudinal extension, a flat front side, a flat rear side as well as two longitudinal edges, and
    at least one label having a longitudinal extension, a flat front side, a flat rear side and an attachment end for being attached to the sausage-shaped product, the at least one label is detachably attached to the carrier strip, wherein at least the attachment end of the at least one label exceeds one of the longitudinal edges of the carrier strip,
    wherein at least one suspension element is provided that has a longitudinal extension and an attachment end for being attached to the sausage-shaped product, the at least one suspension element is detachably attached to the carrier strip, and is correlated with the at least one label, wherein at least the attachment end of the at least one suspension element exceeds one of the longitudinal edges of the carrier strip on the same side as the attachment end of the at least one label.

2. The supply according to claim 1, wherein a plurality of labels is detachably attached to the carrier strip.

3. The supply according to claim 2, wherein the labels are arranged in regular intervals of the carrier strip.

4. The supply according to claim 1, wherein the attachment ends of the labels exceed the longitudinal edge of the carrier strip at the same side.

5. The supply according to claim 1, wherein the at least one label is attached to the front side of the carrier strip in an orientation where its longitudinal extension being at least substantially perpendicular to the longitudinal extension of the carrier strip.

6. The supply according to claim 1, wherein the labels are arranged at least approximately parallel to each other with respect to their longitudinal extensions.

7. The supply according to claim 1, wherein feeding openings are arranged in regular intervals along the carrier strip.

8. The supply according to claim 1, wherein the labels are made of sheet material and each include at least one printable region (P).

9. The supply according to claim 1, wherein the label and the suspension element are arranged at least approximately parallel to each other with respect to their longitudinal extensions.

10. The supply according to claim 1, wherein the attachment end of the at least one suspension element is arranged at least substantially congruently with the attachment end of the at least one label.

11. The supply according to claim 1, wherein the label has an attachment opening at its attachment end, and wherein the attachment opening of the label is at least partially surrounded by the attachment end of the suspension element.

12. The supply according to claim 1, wherein the suspension elements are flexible thread loops.

* * * * *